Figure 1:
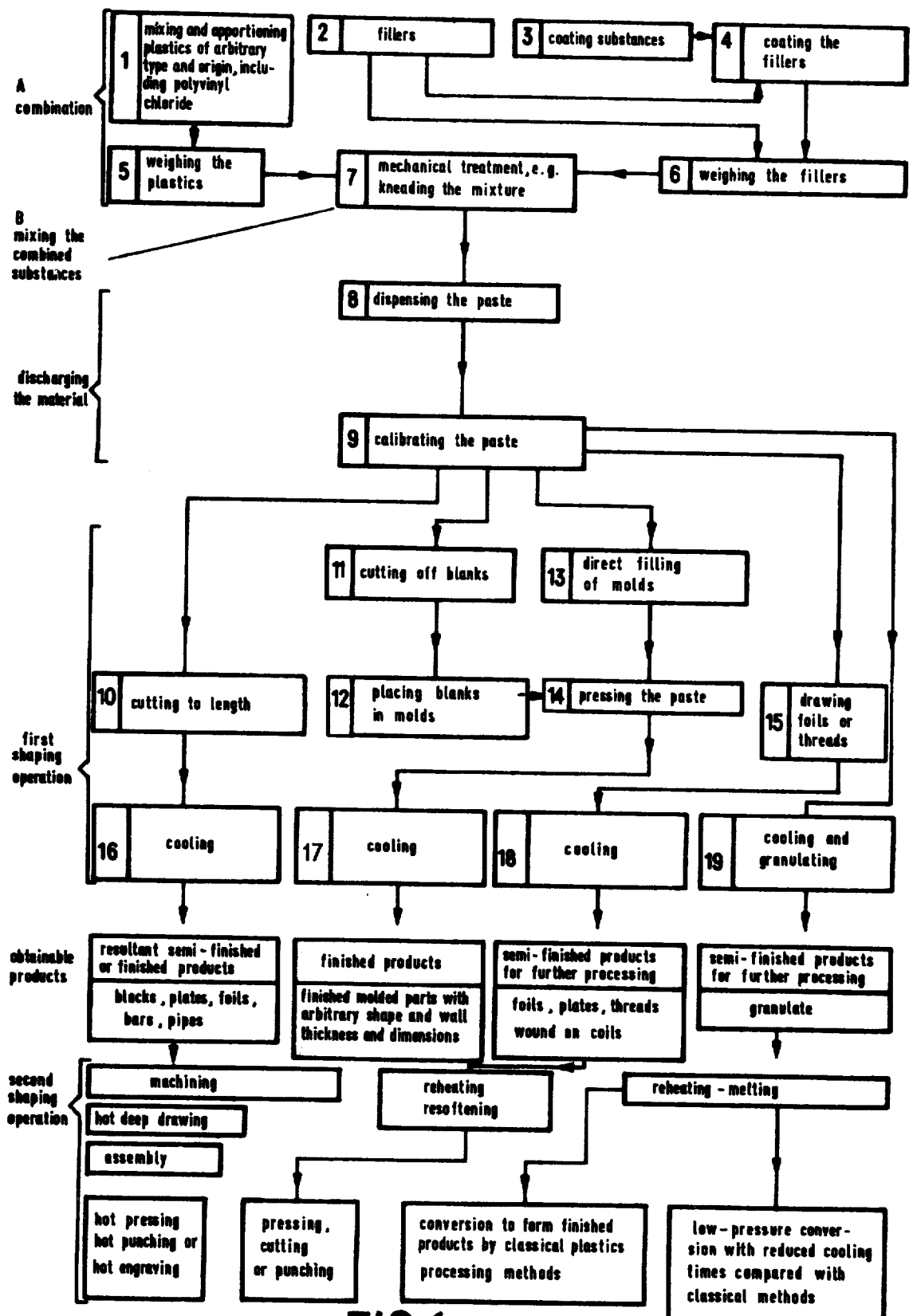

United States Patent [19]

Paturle

[11] 4,003,866

[45] Jan. 18, 1977

[54] CONSTRUCTION MATERIAL AND A PROCESS FOR PRODUCING THE SAME

[75] Inventor: René Paturle, St. Laurent-du-Pont, France

[73] Assignee: Etablissements Paturle S.A., St. Laurent-du-Pont, France

[22] Filed: Jan. 20, 1975

[21] Appl. No.: 542,254

[30] Foreign Application Priority Data

Jan. 22, 1974 Germany .......................... 2402976
Sept. 17, 1974 Germany .......................... 2444420

[52] U.S. Cl. .............................. 260/17.4 R; 260/9; 260/17.4 CL; 260/42.13; 260/42.43; 260/42.45

[51] Int. Cl.² .......................................... C08L 1/02

[58] Field of Search ............... 260/17.4 R, 17.4 CL, 260/9, 42.13, 42.43, 42.45

[56] References Cited

UNITED STATES PATENTS

| | | | |
|---|---|---|---|
| 3,070,557 | 12/1962 | Gessler et al. .......................... | 260/4 |
| 3,406,127 | 6/1964 | Alexander .......................... | 260/2.3 |
| 3,491,034 | 1/1970 | Seelig .......................... | 260/3 |
| 3,554,941 | 1/1971 | Varnell .......................... | 260/9 |
| 3,577,369 | 5/1971 | Hendrickson et al. .......... | 260/17.4 |
| 3,645,961 | 2/1972 | Goldfein .......................... | 260/37 N |
| 3,825,519 | 7/1974 | Murayama et al. .......... | 260/42.13 |
| 3,856,724 | 12/1974 | O'Connor et al. ................. | 260/17.4 |
| 3,888,810 | 6/1975 | Shinomura ...................... | 260/17.4 |

FOREIGN PATENTS OR APPLICATIONS 792,557   3/1958   United Kingdom ............. 260/17.4

*Primary Examiner*—Edward M. Woodberry
*Attorney, Agent, or Firm*—Hubbell, Cohen, Stiefel & Gross

[57] ABSTRACT

A construction material and a process for the preparation thereof, which material comprises a plastic component constituted of a thermoplastic resin; and a filler component constituted of a mineral and/or organic filler at least equal in weight to the amount of the plastic component and the individual particles of which are coated or encapsulated with a polyethylene or polypropylene wax having a molecular weight of from 1,000 to 10,000, a thermofluid high molecular weight polymer, or a silicate coating. The composite material is low in cost and may be processed by conventional techniques, e.g., by molding, extrusion or machining, to produce a variety of useful products.

25 Claims, 2 Drawing Figures

CONSTRUCTION MATERIAL AND A PROCESS FOR PRODUCING THE SAME

This invention relates to a construction material consisting of a mixture which contains as its components at least one plastic material and at least one filler material of a mineral and/or organic type, said filler material(s) comprising at least a share of the total weight of the mixture equal to that of said plastic material(s), as well as to processes for the production of said construction material.

All sorts of waste products are being produced in ever increasing amounts. This is particularly true of plastic wastes such as disposable (one-way) bottles, plastic bags and foils for packaging goods, for example. Attempts to re-use these plastic wastes on a large scale have hitherto been unsuccessful for many reasons, among others, that it is very difficult to separate plastic waste products with very different properties and the remelting of the plastic wastes normally results in the decomposition of the molecules and leads to a marked deterioration of the properties of the plastics. Moreover, remelting the waste products of thermosetting plastics is not possible; it has therefore, not heretofore been possible to carry out regeneration in such instances.

Hitherto, a small amount of fillers, e.g. dyes, has been added to reuseable plastics, in particular thermosetting plastics, in order to produce a particular luster or coloring. These admixtures of fillers are, however, added in small amounts only to freshly produced plastics so that plastic wastes cannot be reused in this manner. The amount of filler which can be added is very small in the case of these known plastics.

The object of the invention is to provide a construction material of the type mentioned at the outset which is inexpensive, suitable for many applications and which may consist to a large extent of waste products, as well as a process for the production thereof which is simple, economical and reliable.

In accordance with the present invention these and other objects are provided by a construction material comprising a mixture of a plastic component constituting at least one thermoplastic resin and a filler component constituting at least one mineral and/or organic filler in an amount at least equal in weight to the amount of the plastic component, and the individual particles of which filler are coated or encapsulated with a polyethylene or polypropylene wax having a molecular weight of from 1,000 to 10,000, a thermofluid high molecular weight polymer, or a silica coating.

The material of the invention does not preferably consist of a plastic in which a small amount of filler is embedded, but rather of two components the first of which includes one or more thermoplastics and the other of which consists of one or more fillers, the filler component having at least a weight equal to the thermoplastic component. The fillers may be both mineral and organic in nature. Both organic fillers of plant origin as well as organic plastics, e.g. comminuted duroplastic materials, may be used as the organic fillers. These fillers may be waste materials which are obtainable at a very low cost and which cannot be used meaningfully in any other way. The construction material of the invention is a mixture of thermoplastics and filler embedded therein. The entire product is a semi-homogeneous material which is a solid mass at room temperature whose character and properties are determined on the one hand by the plastic component and on the other hand by the filler component. By using waste products as the filler, there is a possiblility of re-using useless and unesthetic wastes and discarded plastic waste products. The result is on the one hand a possible contribution to the improvement of the environment and, on the other hand, a construction material which is low in cost and which may be processed by conventional processing methods such as pressing, extrusion and machining as well as which may be used in many fields.

In the case of the construction material of the invention, the plastic component may consist, for example, only of polyethylene, e.g. one portion of freshly produced polyethylene and one share of comminuted polyethylene wastes.

However, in addition to low density polyethylene, other thermoplastics having good fluidity, but another composition, e.g. polyamides or polystyrenes, may also be used as the plastic component of the construction material of the invention.

The composition of the thermoplastic components of the construction material of the invention is especially preferred, particularly if a plurality of different thermoplastics, especially waste plastics, are to be used in the component. Different plastics have very different softening temperature ranges. In order to blend the plastics, it is necessary to convert them to the plastic or liquid state and to mix and combine them under pressure in this condition. If all the plastics employed are to be softened, however, they must be heated to the softening range of the plastic with the highest melting point. This may in turn lead to a partial decomposition of the plastics which melt at lower temperatures. In the composition of the invention, however, the low viscosity polyethylene and, if desired, another thermoplastic with good fluidity, e.g. polyamide, which are rendered almost liquid during heating, cause those non-liquified portions of the liquified thermoplastics to be surrounded by an envelope during liquification of these thermoplastic portions. Plastics with a higher melting point, e.g. plastic wastes of another composition, may be bound in this way and are admixed to form a semi-homogeneous mixture together with the other liquified plastics. In so doing, the share of the other optional plastics and the ratio of polyethylene and other thermoplastics with good fluidity may be varied according to the desired chemical or physical properties. The thermoplastic component of the plastic material of the invention may also consist of polyethylene exclusively as already mentioned.

The construction material according to the invention advantageously incorporates as the filler at least one of the following materials: wood chips, sawdust, asbestos dust, asbestos fibers, ground mica, peat, sulfur, siliceous earth*, sand, graphite, metal shavings, ashes from garbage incineration plants and wastes of thermosetting plastics. In this embodiment of the construction material of the invention, the filler component consists of materials which are formed in considerable amounts as waste materials from manufacturing processes or are obtainable as relatively low-cost natural products. According to the type of filler used, the construction material of the invention has a character which is influenced by the respective filler. Particularly favorable properties are produced when wood waste products are employed.

*The term "siliceous earth" comprises siliceous earth of technical grade as well as SiO₂ or silicic acid.

A preferred embodiment of the construction material of the invention is also produced when the thermoplastics include one or more of the following materials: freshly produced plastics, second grade plastics, recycled plastics, plastic wastes, discarded packagings such as bottles, sacks, bags, used automobile tires, used elastomeric parts, old carpets and covers. In this embodiment of the construction material of the invention, the plastic component may be formed extensively from waste plastics. If the waste plastics are obtained from old plastic parts, these are advantageously comminuted, e.g. by cutting, chopping or grinding, to such an extent that the result is a particulate plastic.

It is particularly advantageous to use comminuted asbestos as the fillers in the construction material of the invention in order to prevent the plastics with the lowest melting points from being overheated and destroyed during heating in the event that the thermoplastic components of the construction material of the invention consist of a plurality of thermoplastics with very different melting ranges, e.g. when the thermoplastic component contains a large share of optional comminuted plastic wastes. The asbestos filler surrounds the individual plastic particles when the components are mixed together and in this way forms a kind of thermal protection for the particles with a low melting point, thereby making it possible to increase the temperature of the entire mixture without the danger of a partial decomposition of the plastics. The use of asbestos as a filler is particularly advantageous when hard polyvinyl chloride wastes are to be used alone or together with other thermoplastic material.

A particularly preferred embodiment of the construction material of the invention is that containing the following substances measured in percent by weight in relation to the individual substances:

50 – 60 % asbestos
50 – 40 % comminuted plastics.

This embodiment of the construction material of the invention is virtually fire-proof, at the same time hard and impact-resistant and is thus substantially more resistant than asbestos.

A particularly preferred embodiment of the aforementioned construction material of the invention is that in which approximately half of the share of comminuted plastics in the mixture consists of plastics with an arbitrary composition and approximately one-fourth consists of polystyrenes and of low density polyethylenes respectively, measured in percent by weight. This ensures that the plastic components only have to be heated to a relatively low temperature (e.g. 250° C up to 190° C) and that thereafter it is possible to mix the plastic components which are already softened and those not yet softened which also permits a mixing of the asbestos components in an especially favorable manner.

Another advantageous embodiment of the construction material of the invention is that in which the material contains the following substances in percent by weight in relation to the individual substances:

40 – 60 % wood wastes (chips, fibers, sawdust),
2 – 6 % plastics for pre-treatment of the wood wastes, e.g. plastics with a low molecular weight between 1000 and 10,000 such as polyethylene waxes or polypropylene waxes,
20 – 30 % plastics of arbitrary composition,
10 – 15 % polystyrenes,
10 – 15 % polyethylenes.

The result of this embodiment of the inventive construction material is a material similar to wood in character, but which is much harder and more resistant than wood and which may be pressed to form molded articles, for example, by conventional forming methods/and which may also be subjected to machining operations.

In an advantageous development of the construction material of the invention, the particles of the filler component, e.g. wood wastes such as wood chips, are mixed with a coating material prior to being mixed with the plastic component, the individual filler particles being respectively coated with a coating of the coating material. One example of this was already cited in the embodiment discussed hereinabove. Waxes of a low molecular polyethylene, or plastics, or high molecular polymers with good fluidity (lesser viscosity at an elevated temperature) are employed for example as the coating agent. Such coatings which penetrate into the pores of the filler particles as well cause an increase in the density of the filler particles. In addition, the affinity of the filler particles with respect to the plastic component is greatly increased in this way so that the filler particles can combine especially well with the plastic component. The cohesion of all components of the mixture forming the construction material is thus greatly enhanced and material properties such as mechanical load, resistance to environmental factors, absorption of moisture, are improved.

An especially advantageous embodiment of the construction material of the invention which has a particularly high heat resistance is one in which the particles of the filler(s) include a coating of silicate material instead of the above coating agent. In this embodiment of the construction material, the filler particles are provided with a coating of silicate material prior to being mixed with the thermoplastic(s). This coating renders the individual filler particles much easier to manipulate. They are very dry and are provided with a hard resistant coating. Moreover, the coated filler particles have a much lower bulk volume than in the non-coated state and they are also protected against the influences of moisture. The fillers coated with silicate constitute a semi-homogeneous material when they are mixed with the plastic component. This material is a solid mass at room temperature whose character and properties are determined on the one hand by the plastic component and by the filler component on the other hand. The coating of the fillers with silicate substantially improves the properties of the material, in particular the processing and machining properties and the resistance to environmental factors. Particularly favorable properties result in this embodiment when wood wastes are used. When wood chips or sawdust thus coated with silicate material are used, the result is an inprovement in the hardness of construction materials of the invention consisting of mixtures containing a plurality of various polymers. Furthermore, the coating of the wood chips and of the sawdust with silicate material also leads to a greater hardness of the resultant construction material even if the plastic portion of the construction material only contains a relatively soft plastic such as low pressure polyethylene for example (polyethylene with a density of 0.92). The use of wood chips or sawdust coated with silicate material thus gives rise to hard construction materials in conjunction with various plastic components and even relatively soft plastic components. The result of mixing the plastic portion of the plastic component with the silicate-coated fillers is that no problems are encountered during subsequent mixing even at elevated temperatures and even when fillers are used which are not heatproof, since the fillers are rendered more resistant to heat by the silicate coating and thus are not destroyed by the operating temperatures at which the plastics are liquified.

Both strongly basic silicates with a pH value in excess of 10.5 and weakly basic silicates, e.g. a weakly basic sodium silicate also termed a "neutral" sodium silicate, may be used as the material for coating the fillers.

The construction material according to the invention is advantageously developed such that the silicate material is sodium silicate. Sodium silicate is particularly suitable for use as a coating agent when wood wastes are employed as the fillers. The wood wastes treated in this way may be especially well mixed with thermoplastics to form construction material of the invention. Moreover, sodium silicate makes the production of the construction material particularly low in cost and economical.

An especially preferred embodiment of construction material of the invention is one in which the material contains the following substances in percent by weight in relation to the individual substances:

40 – 60% wood wastes (chips, fibers, sawdust)
2 – 12% silicate materials for pre-treating the wood wastes
20 – 30% plastics of arbitrary composition
10 – 5% polystyrenes
10 – 15% polyethylenes.

The result of this embodiment of the construction material of the invention is a material similar to wood in character, but which is much harder and more resistant than wood, which may be pressed to form molded articles, for example, by conventional forming methods and which may also be machined.

Preferred embodiments of the construction material of the invention desirably incorporate a sodium silicate of between about 35° and 60° Beaume, for example 38°/40° Beaume, 45° Beaume or 48°/60° Beaume, as the silicate constituent thereof.

In many cases it is not only preferred, as stated above, to provide the filler particles with a coating prior to being mixed with the particles of the plastic component, but in many cases a preferred embodiment of the construction material of the invention is that wherein the particles of the plastic component also have a coating of a coating material, e.g. of wax, a high molecular polymer or a silicate material, prior to being mixed with the filler component. If for example the particles of the plastic component are very fibrous and thus occupy an unfavorable amount of space relative to their weight such as is the case with particles for example which are produced by shredding plastic carpets, then it is preferred to render these flaky or fibrous particles more compact and thus more suitable for further processing steps by pre-treating them with a coating material. Coating materials in this case may be waxes, high molecular polymers or silicate materials as in the case of coating the fillers.

The construction material according to the invention may advtangeously contain additives of resin, hard wood chips, glass fibers, pieces of thermoplastic profiles or bands or pieces of metallic filaments. The construction material of the invention may be rendered particularly resistant to loads in a certain directions by means of such additives or they may enhance the general capacity to withstand stresses in the construction material.

A further preferred embodiment of the construction material is one in which such thermoplastic profile or band additives comprise thermoplastic materials which are resistant to heat, e.g. polyesters, polyamides, polypropylenes or polyethylenes having a density of at least 0.95. This ensures that the additives are not melted and substantially retain their shape in the mixture during the production of the construction material, i.e. when mixing the components at an elevated temperature with partial melting of the components.

An especially preferred embodiment is that in which the additives amount to 5 – 25% by weight calculated on the total weight of the material.

A process for the production of the construction material according to the invention is advantageously designed such that the plastics forming the one component of the total mixture are combined in comminuted form and in the desired proportions, if necessary or desired by means of a pre-processing step, and are mixed together to form a plastic mixture. This plastic mixture is then supplied to a dosing stage, is apportioned in shares corresponding to the desired total mixture and is supplied to a mixer. The fillers forming the second component of the total mixture are supplied to a dosing stage in the desired proportions, if necessary or desired via a pre-processing step, and are apportioned there in shares corresponding to the desired total mixture and are supplied to the mixer simultaneously with or subsequent to said plastic mixture. The plastic mixture and filler components are then heated to a specific temperature and are mixed until a semi-homogeneous pasty mass is formed and the mass is then discharged from the mixer and, if desired, is subjected to other processing steps.

Thus, if the plastic components comprise a plurality of different plastics, in this process they are first apportioned and mixed in proportion, a share of the plastic mixture corresponding to the total composition is then measured out and is supplied to a mixer. The shares of plastic may also be subjected to pre-treatment, e.g., by a process in which the plastic particles are coated with a coating material. In the mixer, the plastic mixture is heated to such an extent that a pasty mass is produced in which the individual plastic proportions are mixed together to form a semi-homogeneous mixture.

In addition, the fillers forming the second component of the total mixture are also introduced into the mixer in correspondingly apportioned amounts. In so doing, it is possible to subject the fillers to pre-treatment processes prior to being introduced into the mixer either separately or in a filler mixture. Such processes render the fillers more suitable for subsequent combination with the plastics for example.

The fillers are also heated in the mixer and are mixed with the plastic components to form a pasty mass. The pasty mass thus formed is then discharged from the mixer and may be processed further if desired, by conventional processing methods such as extrusion, continuous casting, calendering, pressing and granulating after cooling for example. In these processes, the fillers may be introduced under certain circumstances into the mixer simultaneously with the plastic component, heated and mixed there, but in many cases it is advantageous to first introduce the plastic component into the mixer, and to heat and intermix it to form a pasty mass before the fillers are added. With such a mode of operation, a suitable mixing of the shares of plastic among themselves may be accomplished, if desired at temperatures at which only a few of the shares are melted with the shares having the highest melting points still being solid. The fillers are then added later. In so doing, the fillers are not subjected to a high temperature required for melting the shares of plastic for a long period of time, but may even cause a cooling of the entire mass when they are added provided that they have not been pre-heated. This cooling ensures that the fillers will not be decomposed or damaged by the heat. Care must be taken however that the entire mixture is continuously maintained at a temperature in the mixer which is so high that the mass remains pasty (e.g. above 130° C for many mixtures). The final pasty mass is then discharged from the mixer and is further processed.

A number of mineral or plant fillers have a relatively large volume, i.e. low density. In order to increase the density of such fillers and to improve the combination of the fillers with the shares of plastic, it is advantageous when the afore-mentioned process for the production of the plastic material is designed such that fillers are introduced into a pre-mixer apportioned in the desired shares, are there heated, are mixed with a coating agent also supplied to the pre-mixer and are coated prior to being introduced into the mixer. This causes the filler particles to be coated with the coating agent on their surface. Depending on the nature of the fillers, the coating agent may also penetrate into the pores of the filler particles under certain circumstances. In any case, the coating produces an increase in the density of such light filler particles. Moreover, they then combine very well with the shares of the plastic component of the material. The process step of coating the fillers with a coating before intermixing the fillers with the thermoplastic component in the mixer shall hereinafter be termed the "coating process step" (prefilmage).

It is preferred if the coating process step is developed such that a wax of low-molecular polyethylene is used as the coating agent. The fillers may be coated in a pre-mixer at 110° – 130° C.

Another preferred embodiment of the coating process step is designed such that a synthetic resin is used as the coating agent which ensures adhesion or combination of the coated particles with the other thermoplastics.

If especially good cohesion of the particles is required in the construction material of the invention, the coating process step is advantageous carried out such that a thermofluid high molecular polymer is used as the coating agent. Such a thermofluid high molecular polymer penetrates deep into the capillaries or pores of the filler particles during heating due to its low viscosity and provides the particles with a particularly dense coating which produces an excellent combination with the actual plastic component during the subsequent mixing operation in the mixer.

The coating process step as discussed above in several embodiments produces much better cohesion of the filler particles among themselves as well as with the plastic component of the entire mixture than when the same fillers are used without a coating treatment. In addition, the actual mixing time in the mixer may be shortened by approximately 20 – 25% while maintaining the same temperature in the mixer when the coating process step is initially carried out. By using a coating process step, the construction material of the invention attains lower permeability and increased density. In addition, a coating process step may also produce dyeing of the fillers or of the entire plastic material or the coating operation may be carried out with an addition of colors at the same time. Dyed construction materials may also be produced in this way.

An advantageous, embodiment of the process of the invention is in which the plastic mixture and the fillers are heated and intermixed in the mixer in a vacuum. This avoids large amounts of aggressive gases from remaining in the mixer during the time the shares of the plastic component are heated in the mixer. Such aggressive gases attack the mixer itself and destroy it in the course of time. As soon as aggressive gases are formed, they are suctioned out of the mixer by a vacuum pump.

Another favorable embodiment is one wherein the plastic mixture and the fillers are heated and intermixed in the mixer under excess pressure in an inert gas atmosphere. In such an embodiment, aggressive volatile components of the mixer are prevented from attacking the mixer itself.

The process for the production of the construction material of the invention is advantageously designed such that the fillers are supplied to a pre-mixer prior to being intermixed with the plastic components and are heated, intermixed and coated therein with one or more silicate materials also supplied to the pre-mixer. The filler particles are thus surrounded on their surfaces with the silicate coating agent. In so doing, under certain circumstances the silicate may also penetrate into the pores of the filler particles depending on the nature of the fillers. This is the case in particular when wood wastes are used as the filler. The coating produces an increase in the density of the filler particles. The particles are then much easier to manipulate, are very dry and have a very hard coating. Moreover, they then have a much lower bulk volume than in the non-coated state and are also protected against moisture. They combine very well with the shares of the plastic component of the material.

The coating process step is advantageously designed such that the intermixing and coating occur in the pre-mixer at a temperature of 70° – 100° C.

Another preferred embodiment involves intermixing and coating in the pre-mixer in a vacuum. In this manner, aggressive gases which form when the silicates are heated are suctioned out of the mixer and cannot attack it. Furthermore, an improved combination of the silicates with the fillers results.

The process of the invention may advantageously utilize a sodium silicate of 50°160° Beaume as the coating material and involves mixing of such material with the filler in a mixer at a high speed. A sodium silicate with 50°/60° Beaume is very viscous and it is therefore necessary that the mixture consisting of sodium silicate and fillers, in particular wood chips, be heated in a vacuum to a temperature between 70° and 100° C and be intermixed at a high speed in order to attain satisfactory coating of the wood particles with the silicates.

Another preferred embodiment of the process is that in which a sodium silicate of 30°/40° Beaume or 45° Beaume is used as the coating material and such material is intermixed with the fillers at a temperature of approx. 70° C in a mixer at a high speed. Sodium silicates with 38°/40° or 45° Beaume are less viscous than the previously discussed sodium silicates so that it is not necessary in this case to heat the mixture of fillers, in particular wood chips, and the silicate to temperatures in excess of 70° C during coating, but rather it is sufficient to mix the mixture in a vacuum at approx. 70° C in a high-speed rotating mixer in order to attain a satisfactory coating of the wood particles.

Due to the coating of the fillers, in particular wood particles such as wood chips or sawdust, with sodium silicate in the above techniques, it is possible to produce construction material of the invention by mixing the plastic component with the coated filler at an elevated temperature in approximately half the time which would be required to obtain a material which constitutes a mixture of the plastic component and non-coated fillers. The use of fillers coated with silicates thus reduces the required heating time necessary to attain the final paste which consists of a mixture of the plastic component and coated fillers and which may be subjected to further processing operations. Moreover, the filler particles, in particular wood particles, are not affected with respect to their properties due to the shortening of the heating time as a result of the coating and this, in turn, produces an improvement of the mechanical properties of the construction material of the invention as compared to other construction materials.

The construction material of the invention may be produced by introducing the thermoplastics constituting the plastic component and the fillers coated with silicates as described hereinabove into a mixer in correspondingly apportioned amounts, heating the mixture therein with agitation until a semi-homogeneous mass is formed, and then discharging the mass from the mixer and, if desired, subjecting it to further processing operations. Hence, in the event that the plastic component consists of a plurality of different plastics, this component is first apportioned proportionally, is mixed and a share of the plastic mixture proportional to the total composition is then measured out and is introduced into a mixer in this process. The plastic mixture is heated in the mixer to such an extent that a pasty mass is formed in which the individual plastic shares are mixed among themselves to form a semi-homogeneous mixture. In addition, the coated fillers forming another component of the total mixture are introduced into said mixer in correspondingly apportioned shares. The fillers are subjected to pre-treatment methods, in particular the above-discussed coating process step, before they are introduced into the mixture. The coated fillers are also heated in the mixer and are mixed with the plastic component to form a pasty mass which is then discharged from the mixer and, if desired, may be processed further e.g., by extruding, continuous casting, calendering, pressing or granulating after cooling.

A preferred embodiment of a process for the production of construction material of the invention is also achieved by mixing the particles of the plastic component, e.g. particles from comminuted carpets, and coating them with a coating agent prior to being mixed with the filler particles. Similar to the previously discussed filler coating process, this may take place in a premixer for instance, if desired, at an elevated temperature as well. In this way, the density of the plastic particles may be increased due to the envelope, particularly when the particles are flaky, fluffy or fibrous. Waxes of low-molecular polyethylene, synthetic resins, high molecular polymers with good fluidity or silicate materials may be employed as the coating agent. After the plastic particles have been coated, they may be mixed in a mixer with filler particles, also pre-treated if desired, and then processed to form an inventive plastic material.

The inventive process may be developed carried out by mixing the plastic mixture and fillers in the mixer at a temperature of 240° – 400° C. The temperature in the mixer is dependent on the individual plastics and fillers.

The process may be developed advantageously in that, after production in the mixer, the mixture is cooled to a lower temperature either in the mixer itself or in a subsequent container, but only to such a temperature at which the mixture remains pasty, e.g. a temperature in excess of 130° C. The mixture may be maintained in reserve or stored at this temperature for a relatively long time in a pasty state and may be subjected to further processing operations when necessary.

Another advantageous embodiment of the process is that in which, as indicated hereinabove, the mixture of the plastic mixture and fillers is admixed with other additives, e.g. hard wood chips, glass fibers, profile pieces, band pieces of thermoplastic material or metallic filaments. These additives are suitably charged to the mixer when the components begin to undergo semi-homogenization to form a paste and may be mixed thereafter. In this process, the mixing operation is carried out in the mixture after the plastic component and fillers have been supplied until a semi-homogenization of all mixture components and the formation of a pasty mass begins to occur. Additional additives of the above type are then added, for example, to achieve a special reinforcement or structuring of the final material. These additives are then worked into the pasty mass as the mixing operation is continued and are distributed therein substantially uniformly Another embodiment of this process involves admixing the additives approximately 30 to 60 seconds before the mixture is completed. The additives are thus introduced into the mixer at a relatively short time prior to completion of the mass.

The process of the invention may be developed further in that, after being completed in the mixer, the mixture is processed by known plastic processing methods, e.g. extrusion to form billets and foils, hot pressing, granulation, extrusion or calendering to form a processed raw material, e.g. a granulate, or to form semi-finished products such as foils, bands, plates, profiles or to form finished products such as molded parts. During some of the further processing steps, the pasty mass may be processed directly as discharged from the mixer in a warm state, e.g. during extrusion or pressing. In the case of other processing steps, during granulation for example, the pasty mass may be pressed directly through a nozzle for example and the resultant strand cut off at the end or the mass may also be passed into an extruder and the extruded strand cut off.

The process may be developed further such that parts produced from the material mixture are subjected to subsequent surface treatment with a treatment material in order to produce a surface layer thereon. In so doing, a powder consisting of slate, mica, sandstone, emery, carborundum, granite, ceramic material (dyed or undyed) or metal may be used as the subsequent treatment material. In this way, materials may be produced with surfaces having various properties, for example ground surfaces, mirror surfaces and refractory surfaces. A special embodiment of such processes are those in which the powder is worked into the surface of the material mechanically, e.g. by hammering.

Another embodiment involves metallizing the surface of parts produced from the mixture hereof by means of surface treatment methods known in the field of plastics processing. The inventive material may be provided with a metallic surface in this manner.

Four examples of construction materials of the invention and the production thereof are given hereinafter to further explain the present invention:

EXAMPLE 1

Construction material using asbestos as the filler.

This plastic material has the following compositions expressed in percent by weight:

| | |
|---|---|
| asbestos fibers | 60 % |
| thermoplastics | 20 % |
| (of any kind) | |
| polystyrenes | 10 % |
| low-density polyethylenes | 10 % |

A preferred thermoplastic for this example would be polyamide waste material.

The plastic present in commminuted form or as powder and the asbestos fibers are introduced into a mixer and are mixed therein at a temperature from 250° to 290° C, preferably 270° C. The degree of polymerization of the polystyrenes and polyethylenes which are used is insignificant at this temperature. When mixing is begun, the grains of the shares of the arbitrary plastics which are also added may be observed. This is semi-homogeneous after mixing is completed, after, for example 20 minutes however, and it is no longer possible to see individual grains, in particular plastic grains. This can be explained by the fact that, after a few minutes of the mixing operation have passed, the mixture forms spherules upon being heated which coat the particles of the arbitrary plastics which are still present in a solid state, thereby causing them to disappear into the general mixture. In the case of the mixture cited, all components combine excellently and there is no danger of repulsion or separation.

The construction material obtained in this manner no longer has the properties of the various plastics introduced into the mixture, but it is still possible to subject the material to conventional plastic deforming operations, e.g. injection molding, extrusion and pressing. The new material behaves like an inherently homogeneous, but extensively refractory plastic.

EXAMPLE 2

Plastic material with wood as the filler

This material has the following composition expressed in percent by weight:

| | | Percentages of Preferred Example in Parentheses |
|---|---|---|
| wood wastes (wood chips, sawdust) | 40 – 60% | (50) |
| means for coating wood particles | 2 – 6% | (3) |
| plastics (of arbitrary composition) | 20 – 30% | (22) |
| polystyrenes | 10 – 15% | (12.5) |
| polyethylenes | 10 – 15% | (12.5) |

The wood particles are first mixed with the coating materials, e.g. thermoplastics with low molecular weight between 1000 and 10,000. This mixing takes place at a temperature between 120° and 180° C for example, 5 – 10% by weight of polyethylene wax (preferably 5%) or polypropylene wax (preferably 5%), based on the weight of the wood pieces being added to said wood. The wood particles are coated with the plastic wax in this manner.

After the coating process step, the pre-treated wood particles are mixed in the mixer for about 20 minutes with the actual plastic component which consists of plastics with an arbitrary composition, of polystyrene and of polyethylene as well. An excellent combination is formed between the wood particles and the plastics. After a short mixing time, a semi-homogeneous material is formed in which no individual plastic particles can be discerned with the naked eye. Since the wood particles always have a low moisture content, the mixing operation must take place with a vacuum in the mixer in order to be able to suction off the vapors produced. The finished pasty mixture may then be discharged from the mixer and processed further. The novel material also demonstrates a homogeneous behavior in the case of this example as well.

EXAMPLE 3

Construction material using wood chips as filler

This plastic material has the following composition expressed in percent by weight:

| | | Percentages of Preferred Example in Parentheses |
|---|---|---|
| wood chips | 40 – 60% | (50) |
| silicates for coating said wood chips | 2 – 12% | (8) |
| thermoplastics of arbitrary composition | 20 – 30% | (20) |
| polystyrenes | 10 – 15% | (11) |
| polyethylenes | 10 – 15% | (11) |

The wood chips are first mixed with the weakly basic sodium silicate (sometimes termed "neutral") with 38°/40° Beaume, preferably 40° Beaume. Mixing is carried out at a temperature of approx. 70° C, 5 – 20% by weight of the sodium silicate, preferably 20%, based on the weight of the wood chips being mixed with the said wood. The mixing operation is carried out in a vacuum in a mixer rotating at a high speed for about 5 minutes. In this way, the wood chips are coated with the sodium silicate. Subsequent to this coating process step, the pre-treated wood particles are mixed with the actual plastic component which consists of thermoplastics of arbitrary composition, of polystyrene and polyethylene as well in the actual mixer. The wood particles combine excellently with the plastic. After a short mixing time of about 20 minutes, a semi-homogeneous material is produced in which no separate plastic particles can be discerned with the naked eye. Since the wood particles always have a low moisture content, the mixing operation must take place in a vacuum in the mixture in order to be able to suction off the vapors produced. The finished pasty mixture may then be discharged from the mixer and processed further.

Further processing may be performed by conventional processing methods, e.g. rolling, extrusion, injection molding and pressing. The material is shaped while it has a pasty consistency at an elevated temperature. Since shaping may be executed with low pressures, very light, simple and low-cost processing means and machines are the result.

EXAMPLE 4

Plastic material using wood as the filler

This material has the following composition expressed in percent by weight:

|  |  | Percentages of Preferred Example in Parentheses |
|---|---|---|
| wood wastes (wood chips, sawdust) | 40 – 60% | (50) |
| sodium silicate of 38/40° or 45° Beaume | 2 – 12% | (8) |
| thermoplastics of arbitrary composition | 20 – 30% | (20) |
| polystyrenes | 10 – 15% | (11) |
| polyethylenes | 10 – 15% | (11) |

In this example, a construction material is produced in a manner analogous to that described in Example 1. However, since sodium silicate of 38°/40° or 45° Beaume is less tough than the sodium silicate of 58°/60° Beaume used in Example 1, the wood particles may be coated at a temperature of approx. 70° C and it is not necessary to use higher temperatures. Moreover, the procedure is the same as recited in Example 1 and the resultant pasty mass may be processed further to form molded articles, e.g. by injection molding, pressing, extrusion.

Tests have shown that the construction material of the invention whose composition and production have been explained hereinbefore has a number of favorable properties which show that this is truly a completely novel material. The essential properties of this material are cited below:

The construction material may be shaped by pressing or injection molding using little force or low pressures (approx. a few kilograms to 30 kg/cm², preferably 3.0 kg/cm²).

Due to the stiffness of the material after pressing or after injection molding, it is not necessary to cool the manufactured molded article before it is formed. In general, the stiffness of the material is excellent irrespective of the shaping process employed (coating, rolling, extruding, continuous casting) and it is not necessary to take any special security measures to manipulate or handle this material.

Shrinkage is very low or even zero. This leads to the following basic consequences:

Since shaping may take place at low pressures, the result is very light, simple and low-cost processing means and machines.

Molds with low stress or load resistance, e.g. of wood or plaster of Paris, may be employed.

Considerably shortened cooling times result in the magnitude of a few seconds and are thus approx. 50% less than the cooling times in the case of conventional plastics, thereby increasing the number of work cycles.

It is possible to provide very different wall thicknesses in one and the same molded article.

Other properties which have become evident during the tests are the following:

The possibility of embedding parts, e.g. during the pressing process.

The possibility of embedding metallic reinforcements analogous to those provided in reinforcing cement or the honeycomb type.

The possibility of providing an enveloping coating by means of a powder or by means of small particles which penetrate into the surface.

The possibility of plating the material by the action of heat.

Good form-retaining properties.

The density of the inventive material fluctuates between 0.8 and 2.5 according to the composition.

No deformations are caused by rapid quenching in cold water.

The cooled material of the invention may be machined by the following known machining methods: drilling, cutting, tapping, milling, polishing, turning and connecting by wood screws or nails according to the special composition.

The possibility of hot shaping: bending, rolling, arching or hammering.

May be welded or soldered to the actual material with or without the use of additional material.

Figure 2:
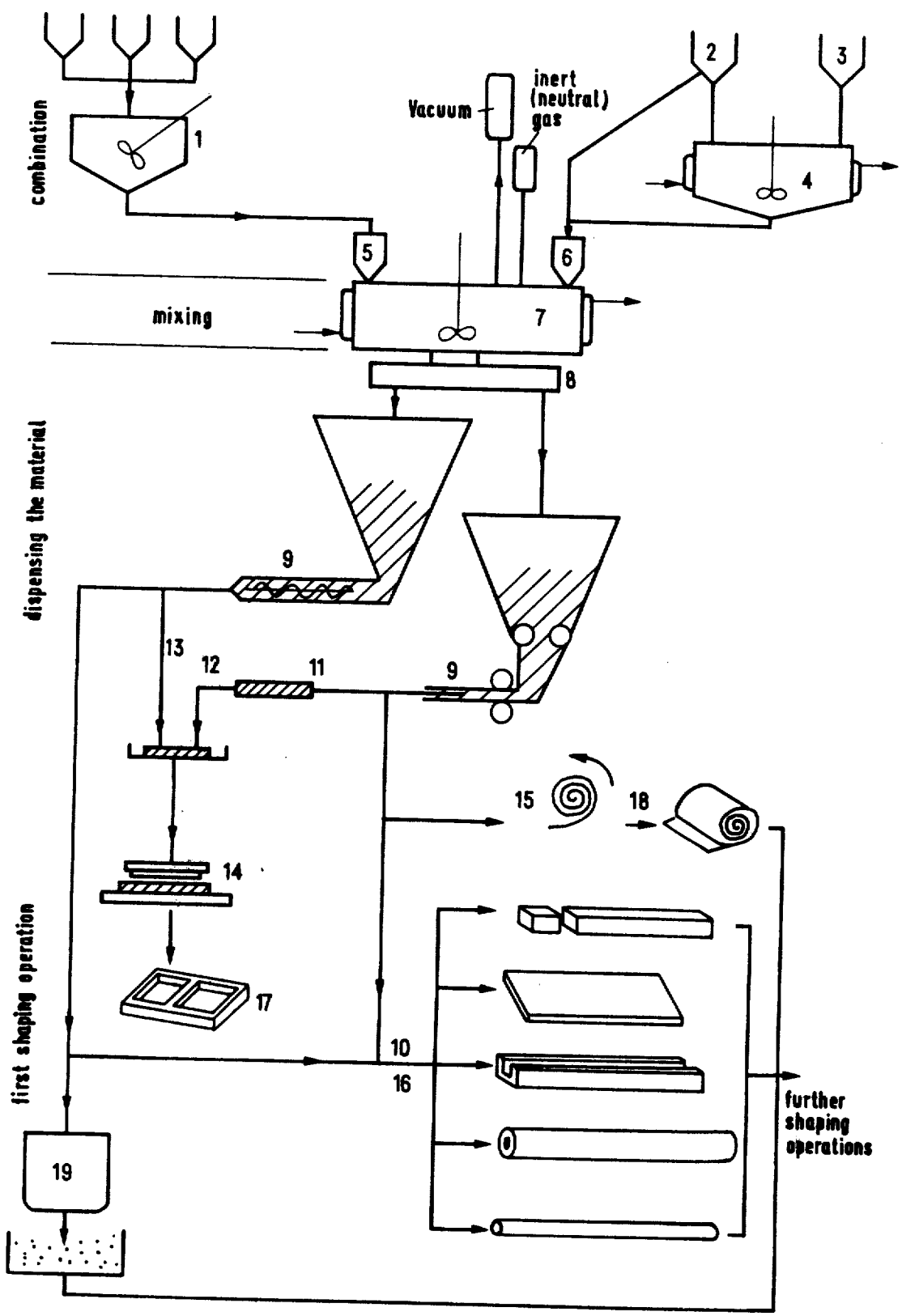

The invention will now be explained in more detail by means of examples in conjunction with the drawing, in which:

FIG. 1 is a schematic block diagram showing the successive steps employed in the process of the invention, and FIG. 2 is a schematic illustration of a device for carrying out the process.

The prerequisite for mixing plastic particles and fillers is that the respective substances be present in a state suitable for mixing. In many cases, therefore, it is necessary to convert the plastics, in particular waste plastics, into a comminuted particulate form before they are used.

The successive steps involved in the preferred embodiments of the process are illustrated schematically in FIG. 1. In a pre-mixing stage 1, a mixture is produced of apportioned shares of plastic of any kind and origin, if desired including polyvinyl chloride. It is also possible to to mix, coat or surround the plastic particles with a coating material in the pre-mixer 1. One or more fillers, e.g. asbestos fibers or wood chips, are stored in 2. Coating substances, e.g. polyethylene or polyamide wax or sodium silicate are stored in 3.

The plastic mixture issuing from the pre-mixer 1 is apportioned in a dosage stage 5, e.g. it is weighed out in the desired amount. The required amounts of filler are apportioned, e.g. by weighing, in a dosage stage 6. The amounts of filler are supplied either directly from the storage hoppers 2 to the dosage stage 6 or, when the coating process step is utilized, the fillers are first introduced into a coating stage 4 in which the fillers are mixed and heated together with coating substances issuing from the storage hopper 3 so that the coating substances coat and encapsulate the individual particles of the fillers. In this case, the coated fillers are supplied from the coating stage to the dosage stage 6.

The apportioned shares of the plastic mixture or the fillers, if desired coated, are supplied by the dosage stages 5 and 6 to the actual mixing operation 7 in which the plastic component is mixed with the filler component by the action of heat; the temperature may increase up to 400° C depending on the materials selected. Mixing may be performed if desired in a vacuum or in an inert gas atmosphere and is carried out until a pasty mass is formed. The pasty mass produced in the mixing operation is discharged through a discharge device 8 after completion and, if desired, may be subjected to further processing operations.

The finished pasty mixture, for example, may be initially pressed through a calibrating nozzle 9 and thereafter extruded in the form of a strand or plate. Pieces of desired length may be cut off the extruded strand at 10 and then cooled at 16. In this manner, blocks, plates, foils, yarn, pipes, profiles and bars may be produced. All these semi-finished products may then be subjected to non-cutting shaping operations or to hot shaping operations to form the desired parts or they may be installed in constructions as structural elements or may be shaped further by hot pressing.

It is also possible to cut the finished mass into pieces after it has emerged from the calibration stage. These pieces are then placed in press molds as pressing blanks and are pressed therein to form the desired parts 11, 12, 13, 14. It is also possible to subject the emerging paste to a pressing operation 14 directly. The parts formed in a pressing operation may either be processed further after cooling 17 together with other parts, may be assembled or may be used as finished parts.

Furthermore, it is possible to press the pasty mass emerging from the calibration stage through nozzles at 15 and to extrude and cool it at 19 to form foils or fibers. Semi-finished products such as foils, plates, threads and the like are obtained in this manner.

It is also possible to permit the finished paste to cool first of all and to then granulate it, if desired, by known processes. The granulate can thereafter be processed to form finished products by injection molding, extrusion or pressing methods which are common in the field of plastics processing. It is then remelted again. It is also possible to remelt the granulate and shape it in methods carried out with subatmospheric pressure, subsequent cooling being carried out much more rapidly than in the case of pure plastics.

The foils, plates or threads produced from the inventive material may also be reheated or resoftened and then shaped by pressing, punching or engraving.

FIG. 2 schematically illustrates a device for the production of the construction material of the invention. The various plastics which are to form the plastic component of the material are supplied from storage containers to a pre-mixer 1, are mixed together therein, are subsequently passed on to a weighing means 5 and from there are then passed into a mixer 7. The mixer is designed as a closed chamber whose walls may be heated, e.g. by conducting a heating medium therethrough. A stirring element with a plurality of stirring arms which may be set in rotation is located in the chamber.

The device also has storage containers for fillers of which two containers 2 and 3 are illustrated. Fillers may be supplied from these storage containers directly to a weighing means 6 where the shares thereof are weighed and thereafter introduced into said mixer. The filler storage containers 2 and 3 are arranged upstream of a pre-mixing chamber 4 into which fillers from the containers 2 and 3 may be introduced if desired. The pre-mixing chamber 4 has substantially the same construction as the mixer 7.

Fillers can not only be mixed in the pre-mixer 4, but may also be mixed with coating substances and heated so that the individual particles of the fillers are coated by the coating substances, e.g. silicates (coating stage). For instance, the storage container 2 may contain a filler and the storage container 3 may contain a coating substance, e.g. a silicate. After the coating operation has been completed in the pre-mixer 4, the coated fillers may then be supplied to the weighing means 6 and passed from there into the mixer 7. The mixer 7 may be connected both to an evacuable container in order to be able to produce a vacuum in the mixer and selectively to a pressurized gas reservoir in order to be able to produce an atmosphere of an inert gas above the mixture in the mixer.

The mixer 7 is located upstream of a discharge device 8 which may be designed as a screw or piston conveyor means or as a tilting means for example which supplies the mass to a storage container for instance. Such a storage container, which may also be heated, may be located upstream of extruding and calibrating devices 9. Bars or plates may be extruded by means of the calibrating device. The extruded bars may be cut into pieces and also produce blocks, plates, profiles, pipes and bars 16 after cooling. The extruded material may, alternatively be supplied directly to a pressing mold (die) 13 or may be cut into pieces which are then supplied to pressing molds (dies) 12 as blanks 11 and there pressed. Finished products 17 may be obtained in this way by processing these in a press 14.

It is also possible to produce elongated products such as threads or bands for example which may be wound upon coils 15 or 18 by extruding the pasty mass. These coils may be used after being reheated to supply pressing, punching or engraving means.

It is also possible to supply the pasty material directly to a granulating means 19 and to process it to form granulate. The granulate obtained in this manner may be employed in many different processing methods, e.g. in a low pressure molding method or a vacuum molding method. Very light molds of plaster of Paris, wood or plastics for example may be used to shape the granulate.

The invention is not restricted to the examples cited. The mixing operation may be carried out with conventional kneading mixers for example. It is also possible to introduce additives in the form of metallic filaments or plastic filaments or glass fibers into the material mixture shortly before it is finished in the mixer, thereby imparting particular reinforcement or strength to the material in this manner.

What is claimed is:

1. A construction material which comprises a mixture of:
    a. a plastic component constituting at least one thermoplastic resin; and
    b. a filler component consitituting at least one mineral and/or organic filler in an amount at least equal in weight to the amount of said plastic component, the individual particles of the filler being coated or encapsulated with a polyethylene or polypropylene wax having a molecular weight of from 1,000 to 10,000, a thermofluid high molecular weight polymer, or a silicate coating material.

2. The construction material of claim 1, wherein at least one thermoplastic resin comprising the plastic component of the mixture is low density polyethylene.

3. The construction material of claim 1, wherein the plastic component comprises as a thermoplastic resin constituent thereof a polyamide resin having good fluidity.

4. The construction material of claim 1, wherein the plastic component comprises as a thermoplastic resin constituent thereof a polystyrene resin having good fluidity.

5. The construction material of claim 1, wherein the filler is wood chips, sawdust, asbestos dust, asbestos fibers, peat, sulfur, siliceous earth, sand, graphite, metal shavings, ashes from garbage incineration plants and wastes of thermosetting plastics.

6. The construction material of claim 1, wherein the thermoplastic resin comprising the plastic component is a freshly produced resin, a recycled resin, or a comminuted plastic waste material.

7. The construction material of claim 1, containing the following substances in percent by weight:
10–60% asbestos
50–40% comminuted plastics.

8. The construction material of claim 7, wherein approximately half of the comminuted plastics in the mixture consists of plastics with an arbitrary composition and approximately one-fourth consists of polystyrenes and low density polyethylene, respectively, in percent by weight.

9. The construction material of claim 1, consisting essentially of the following substances, in percent by weight:
  a. as the filler component 40–60% wood wastes (chips, fibers, or sawdust), and 2–6% of a polyethylene or polypropylene wax having a molecular weight of from 1,000 to 10,000 coating or encapsulating the wood wastes; and
  b. 20–30% plastic of arbitrary composition, 10–15% polystyrene, and 10–15% low density polyethylene.

10. The construction material of claim 1, wherein the coating material on the filler particles is sodium silicate.

11. The construction material of claim 1, consisting essentially of the following substances, in percent by weight:
  a. as the filler component 40–60% wood wastes (chips, fibers, or sawdust), and 2–12% of a silicate material coating or encapsulating the wood wastes; and
  b. as the plastic component 20–30% plastic of arbitrary composition, 10–15% polystyrene, and 10–15% low density polyethylene.

12. The construction material of claim 1, incorporating as a heat-resistant additive hard wood chips, glass fibers, particulate elements of a heat-resistant thermoplastic resin selected from polyester, polyamide, polypropylene and polyethylene (density of at least 0.95) resins, or pieces of metallic filaments.

13. A process for the preparation of the construction material of claim 1, which comprises:
  a. admixing at least one thermoplastic resin with one or more additional resinous materials in comminuted form to produce said plastic component;
  b. pre-mixing a mineral and/or organic filler with a polyethylene or polypropylene wax having a molecular weight of from 1,000 to 10,000, a thermofluid high molecular weight polymer, or a silicate coating material therefor, and heating the mixture thereof to coat or encapsulate the individual particles of the filler with said coating material and thereby form said filler component;
  c. mixing the plastic and filler components at elevated temperatures to form a semi-homogeneous, pasty mass; and
  d. recovering the pasty mass and forming said construction material therefrom.

14. The process of claim 13, wherein the coating material applied to the filler in step (b) is a low molecular weight polyethylene wax.

15. The process of claim 13, wherein the filler is pre-mixed with the coating material therefor in step (b) at temperatures of from 110–130° C.

16. The process of claim 13, wherein the plastic and filler components are heated and mixed in step (c) in a vacuum.

17. The process of claim 13, wherein the plastic and filler components are heated and mixed in step (c) under excess pressure in an inert gas atmosphere.

18. The process of claim 13, wherein the coating material applied to the filler in step (b) is a silicate.

19. The process of claim 18, wherein the filler is pre-mixed with the coating material therefor in step (b) at temperatures of from 70°–100° C.

20. The process of claim 18, wherein the filler is pre-mixed with the coating material therefor in step (b) under a vacuum.

21. The process of claim 18, wherein the coating material applied to the filler in step (b) is a sodium silicate of 50°/60° Baume, of 30°/40° Baume, or 45° Baume.

22. The process of claim 13, wherein the thermoplastic resin incorporated in the plastic component is pre-mixed, prior to step (c), with a polyethylene or polypropylene wax having a molecular weight of from 1,000 to 10,000, a thermofluid high molecular weight polymer, or a silicate coating material therefor and coated or encapsulated with said coating material.

23. The process of claim 13, wherein the plastic and filler components are heated and mixed in step (c) at temperatures of from 240°–400° C.

24. The process of claim 13, wherein the plastic and filler components are admixed in step (c) with hard wood chips, glass fibers, particulate elements of a heat-resistant thermoplastic resin selected from among polyester, polyamide, polypropylene and polyethylene (density of at least 0.95) resins, or metallic filaments, as heat-resistant additives therefor.

25. The process of claim 24, wherein the plastic and filler components are admixed with said additives when said components are semi-homogenized and within 30 to 60 seconds before termination of the mixing operation with the mixture in paste form.

* * * * *

UNITED STATES PATENT OFFICE
CERTIFICATE OF CORRECTION

Patent No. 4,003,866              Dated January 18, 1977

Inventor(s) Rene Paturle

It is certified that error appears in the above-identified patent and that said Letters Patent are hereby corrected as shown below:

Column 5, line 33:    "10-5% polystyrenes" should read --10-15% polystyrenes--

Column 11, line 28:    "commminuted" should read --comminuted--

Column 17, line 14:    "10-60% asbestos" should read --50-60% asbestos--

Signed and Sealed this thirtieth Day of August 1977

[SEAL]

Attest:

RUTH C. MASON
*Attesting Officer*

C. MARSHALL DANN
*Commissioner of Patents and Trademarks*